(12) United States Patent
Tan et al.

(10) Patent No.: US 7,478,559 B2
(45) Date of Patent: Jan. 20, 2009

(54) CAPACITIVE PRESSURE SENSOR WITH A CANTILEVER MEMBER

(75) Inventors: Woei Wan Tan, Singapore (SG); Pei Ge, Singapore (SG); Eng Hock Francis Tay, Singapore (SG); Jyh Siong Phang, Singapore (SG)

(73) Assignee: National University of Singapore, Singapore (SG)

( * ) Notice: Subject to any disclaimer, the term of this patent is extended or adjusted under 35 U.S.C. 154(b) by 0 days.

(21) Appl. No.: 10/581,782

(22) PCT Filed: Dec. 3, 2004

(86) PCT No.: PCT/SG2004/000395

§ 371 (c)(1),
(2), (4) Date: Mar. 15, 2007

(87) PCT Pub. No.: WO2005/054804

PCT Pub. Date: Jun. 16, 2005

(65) Prior Publication Data

US 2008/0022777 A1    Jan. 31, 2008

Related U.S. Application Data

(60) Provisional application No. 60/526,842, filed on Dec. 4, 2003.

(51) Int. Cl.
*G01L 9/12* (2006.01)
(52) U.S. Cl. .......................... 73/718; 73/724

(58) Field of Classification Search ............... 73/718, 73/724, 780, 862.626, 862.636–862.939; 438/52, 53
See application file for complete search history.

(56) References Cited

U.S. PATENT DOCUMENTS

| 4,335,608 | A |   | 6/1982 | Wood et al. |
| 4,804,944 | A |   | 2/1989 | Golladay et al. |
| 4,944,187 | A | * | 7/1990 | Frick et al. .............. 73/718 |
| 5,115,679 | A |   | 5/1992 | Uhlarik |
| 5,146,787 | A |   | 9/1992 | Thomas et al. |

(Continued)

FOREIGN PATENT DOCUMENTS

DE    197 40 244    2/1998

OTHER PUBLICATIONS

Ajluni C, *Low-Pressure Sensor Opens Wide Applications Frontier*, Electronic Design, vol. 44, pp. 59-64, Dec. 16, 1996.

(Continued)

*Primary Examiner*—Edward Lefkowitz
*Assistant Examiner*—Punam Patel
(74) *Attorney, Agent, or Firm*—Christie, Parker & Hale, LLP

(57) ABSTRACT

A capacitive pressure sensing device comprising, a base member, a diaphragm member deflectable under an external pressure, a cantilever member disposed between the base member and the diaphragm member and supported on a support structure, wherein the base member and the cantilever member form a capacitor structure of the device and wherein deflection of the diaphragm member beyond a threshold value causes the cantilever member to deflect to cause a capacitive change in the capacitor structure.

18 Claims, 14 Drawing Sheets

U.S. PATENT DOCUMENTS

| | | | |
|---|---|---|---|
| 5,163,463 A | 11/1992 | Gassman et al. | |
| 5,309,764 A | 5/1994 | Waldrop et al. | |
| 5,936,164 A | 8/1999 | Sparks et al. | |
| 6,006,607 A | 12/1999 | Bryzek et al. | |
| 6,051,853 A | 4/2000 | Shimada et al. | |
| 6,122,973 A | 9/2000 | Nomura et al. | |
| 6,460,234 B1 * | 10/2002 | Gianchandani | 29/25.35 |
| 6,472,244 B1 | 10/2002 | Ferrari et al. | |
| 6,595,064 B2 | 7/2003 | Drewes et al. | |
| 6,604,425 B1 * | 8/2003 | Hsu et al. | 73/718 |
| 6,631,645 B1 | 10/2003 | Satou et al. | |

OTHER PUBLICATIONS

G. Vass, *The Principles of Level Measurement*, Sensors, vol. 17, pp. 55-64, 2000.

Kasten, K, et al., *CMOS-compatible capacitive high temperature pressure sensors*, Sensors and Actuators, vol. 85, pp. 147-152, 2000.

Tajima, R, et al., *Development of soft and distributed tactile sensors and the application to a humanoid robot*, Advance Robotics, vol. 16, No. 4, pp. 381-397, 2002.

International Preliminary Examination Report for PCT/SG2004/000395, dated Jun. 7, 2006.

Chau, Kevin H.-L. et al.; Pressure and Sound Measurement; Measurement, Instrumentation, and Sensors Handbook CRCnetBase 1999; CRC Press LLC.

* cited by examiner

CAPACITIVE PRESSURE SENSOR WITH A CANTILEVER MEMBER

CROSS-REFERENCE TO RELATED APPLICATION

This application is a National Phase Patent Application of International Application Number PCT/SG2004/000395, filed on Dec. 3, 2004, which claims the benefit of and priority to U.S. Provisional Patent Application No. 60/526,842, filed on Dec. 4, 2003.

FIELD OF INVENTION

The present invention relates broadly to a capacitive pressure sensing device, a method of pressure sensing and to a method of fabricating a pressure sensing device.

BACKGROUND

Pressure sensing is one of the most established areas of sensor technology. One specialised application of pressure sensors is hydrostatic tank gauging (HTG). HTG is a pressure-based tank gauging system that uses a combination of pressure and temperature measurements to provide a totally automated, multiple measurement system for liquid inventory measurements.

Using pressure sensors for HTG systems is an emerging way to accurately gauge liquid inventory as well as to monitor transfers in tank farms and similar multi-tank storage facilities. Increasingly, HTG systems are also employed for storage tank leak detection. The interest in pursuing better leak detection and prevention methods is prompted by concerns for environmental protection, coupled with increasingly stringent legislation and regulation.

Traditional HTG installations involve disrupting the integrity of the tank wall in three or more places to mount multiple pressure and temperature sensors. Each sensor is a complex combination of electrical and mechanical components. Microelectromechanical Systems (MEMS) technology offers a means of eliminating the need for multiple sensors as it allows on-chip integration of pressure and temperature transducers.

While there is potential for combining various sensors and signal conditioning circuit into one microelectromechanical system, silicon micromachined capacitive pressure sensors such as those described in U.S. Pat. Nos. 6,631,645, 6,051,853, 6,122,973 and 6,595,064 are not suitable for hydrostatic measurements. The reason for this is that pressure sensors for HTG systems must be able to withstand the large pressure inside the tanks, and at the same time be sensitive to the relatively small pressure changes brought about by variations in the fluid.

In typical micro-capacitive pressure devices, a flexible diaphragm serves as one electrode of a capacitor, whereas the other electrode is located on a substrate beneath it. As the diaphragm deflects in response to the applied pressure, the average gap between the electrodes changes, leading to a change in the capacitance. For capacitive pressure sensors to operate in a high pressure environment, the movable plate must be thick. The trade-off introduced by the use of a thick diaphragm is typically low sensitivity to small changes in pressure. Consequently, a parallel plate capacitive pressure sensor would not be capable of detecting the relatively small pressure variations in a high pressure environment.

Hence, it is with the knowledge of the above concerns and restrictions that the present invention has been made.

SUMMARY

In accordance with a first aspect of the present invention there is provided a capacitive pressure sensing device comprising a base member; a diaphragm member deflectable under an external pressure; a cantilever member disposed between the base member and the diaphragm member and supported on a support structure; wherein the base member and the cantilever member form a capacitor structure of the device; and wherein deflection of the diaphragm member beyond a threshold value causes the cantilever member to deflect to cause a capacitive change in the capacitor structure.

The device may further comprise a contact member moving relative to the cantilever member under deflection of the diaphragm member; and wherein the contact member contacts the cantilever member when the diaphragm member is deflected beyond the threshold value and causes deflection of the cantilever member.

The contact member may be disposed on the base member.

The support structure supporting the cantilever member may be disposed on the diaphragm member.

The contact member may be disposed on the diaphragm member.

The support structure supporting the cantilever member may be disposed on the base member.

The contact member may comprise a contact area disposed symmetrically around said support structure supporting the cantilever member.

The support structure supporting the cantilever member may centrally support the cantilever member.

The cantilever member may comprise polysilicon.

The diaphragm member may comprise polysilicon.

The base member may comprise a silicon wafer.

The base member may comprise a glass substrate.

The contact member may comprise a nitride material.

In accordance with a second aspect of the present invention there is provided a method of pressure sensing comprising deflecting a diaphragm member under an external pressure beyond a threshold value to cause a cantilever member to deflect under the influence of the diaphragm member; and wherein deflection of the cantilever member causes a capacitive change in a capacitive structure including the cantilever member.

In accordance with a third aspect of the present invention there is provided a method of fabricating a pressure sensing device comprising forming a base member; forming a diaphragm member deflectable under an external pressure; forming a cantilever member disposed between the base member and the diaphragm member and supported on a support structure; wherein the base member and the cantilever member form a capacitor structure of the device; and wherein deflection of the diaphragm member beyond a threshold value causes the cantilever member to deflect to cause a capacitive change in the capacitor structure.

Forming the cantilever member may comprise utilising thin film deposition techniques and sacrificial etching techniques.

Forming the diaphragm member may comprise utilising thin film deposition techniques and etching techniques.

Forming the base member may comprise providing a substrate.

Forming the base member may comprise etching the substrate.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

The example embodiments described herein can provide a pressure sensing device that is able to measure small pressure variations in the presence of a large constant load.

The main application of the example embodiments can be in hydrostatic tank gauging (HTG) systems. The pressure-capacitance relationship of the device described in the example embodiments is non-linear, but smart sensor technology can be used to compensate for non-linear behavior with minimal or no user intervention.

The example embodiments can provide a micro-capacitive pressure sensor for HTG, an emerging way to accurately gauge liquid inventory and to monitor transfers in tank farms. Since industrial storage vessels are huge, the sensing element must be able to withstand a high pressure, and yet be sensitive enough to detect the relatively small pressure changes brought about by variations in the fluid head. To achieve these apparently conflicting requirements, a novel three-plate structure is proposed.

The micro capacitive pressure sensor in the example embodiments for detecting small pressure changes in the presence of a large constant load, comprises of three parallel plates.

Figure 1:
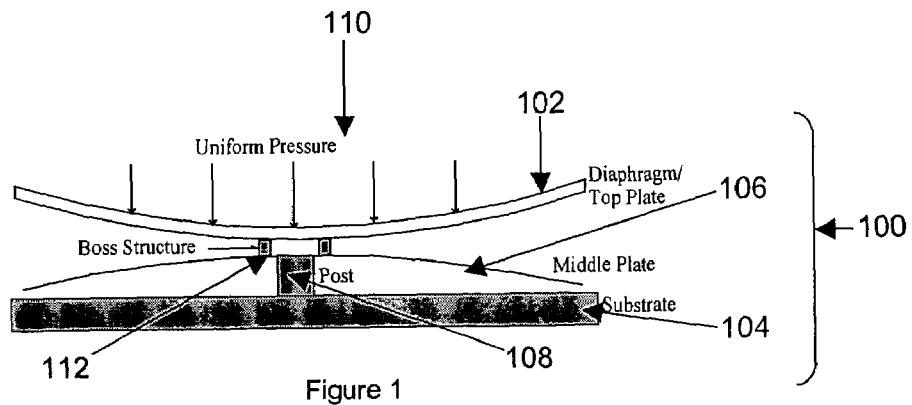
FIG. 1 is a schematic diagram of a MEMS pressure sensor in an example embodiment.

In an example embodiment, a micro capacitive pressure sensing device 100 with a three-plate structure is illustrated in FIG. 1. As in typical parallel plate capacitive pressure sensors, one of the plates is the diaphragm 102 while the second plate is the silicon substrate 104. The device 100 is designed in a manner to avoid rupture during exposure to a particular pressure regime. In the example embodiment, the diaphragm 102 is designed to be thick enough not to rupture. A plate, referred to as the middle plate 106, is placed between the diaphragm 102 and the device substrate 104. The middle plate 106 is a free standing structure supported only at the centre by a post 108. When a pressure 110 is applied, the diaphragm 102 will deflect. Beyond a pre-determined threshold pressure, a boss ring structure 112 etched below the thick diaphragm 102 will come into contact with the middle plate 106 and cause it to deflect. Pressure is measured by monitoring the change in capacitance between the middle plate 106 and the silicon substrate 104. Since the middle plate 106 is a cantilever, it amplifies the small deflections in the thick diaphragm 102 and thus enabling small changes in pressure to be detected.

Figure 2:
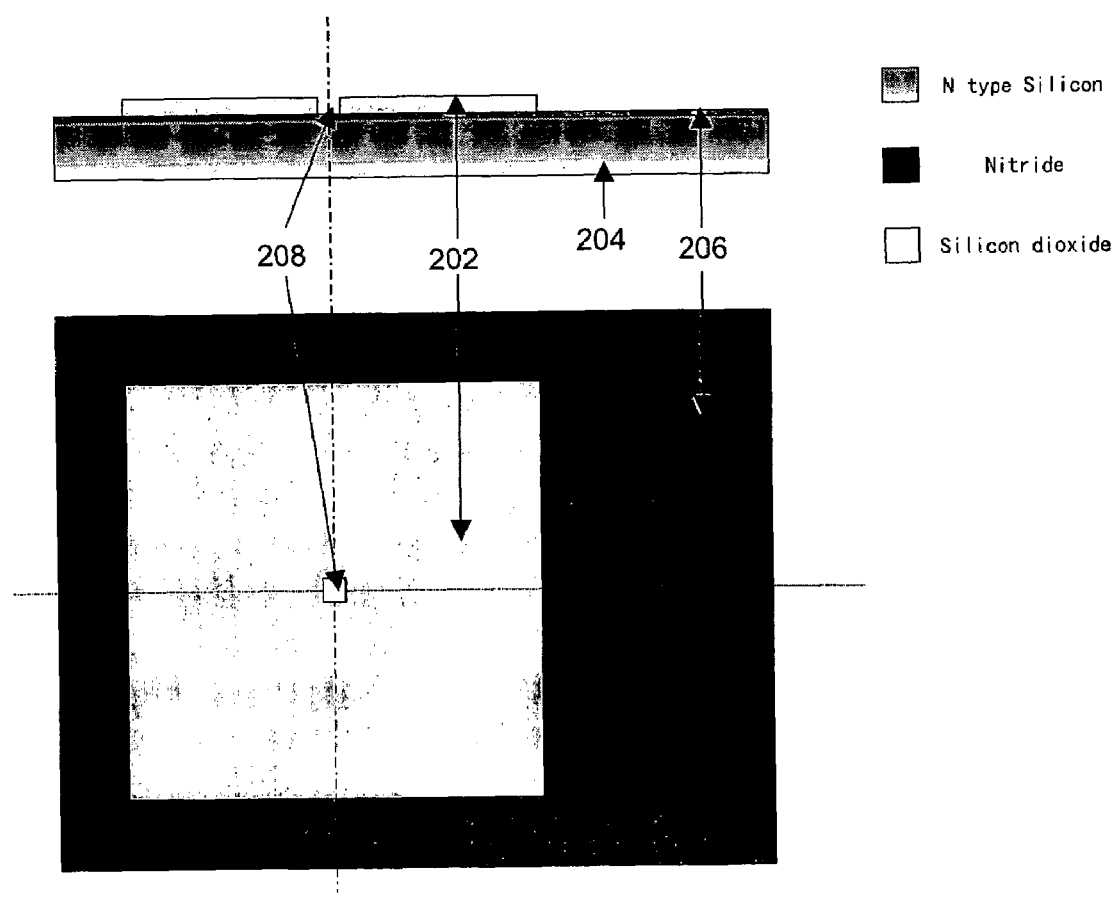
FIG. 2 is an illustration of a silicon dioxide sacrificial layer deposition and patterning in an example embodiment.

In this example embodiment, the steps for fabricating the device using surface micromachining techniques are as follows. In Step 1, as illustrated in FIG. 2, a sacrificial silicon dioxide layer 202 of about 1000 µm×1000 µm×2.5 µm is laid on a n-type silicon wafer 204 that is coated with a nitride layer 206 of about 0.3 mm in this example embodiment. The silicon dioxide layer 202 defines the air gap between the proposed bottom 104 and the middle 106 plates as was illustrated in FIG. 1. By patterning and etching the silicon dioxide layer 202, a hole 208 of about 40 µm×40 µm is formed so that the proposed post 108 for supporting the middle plate 106 as illustrated in FIG. 1 can be fabricated.

Figure 3:
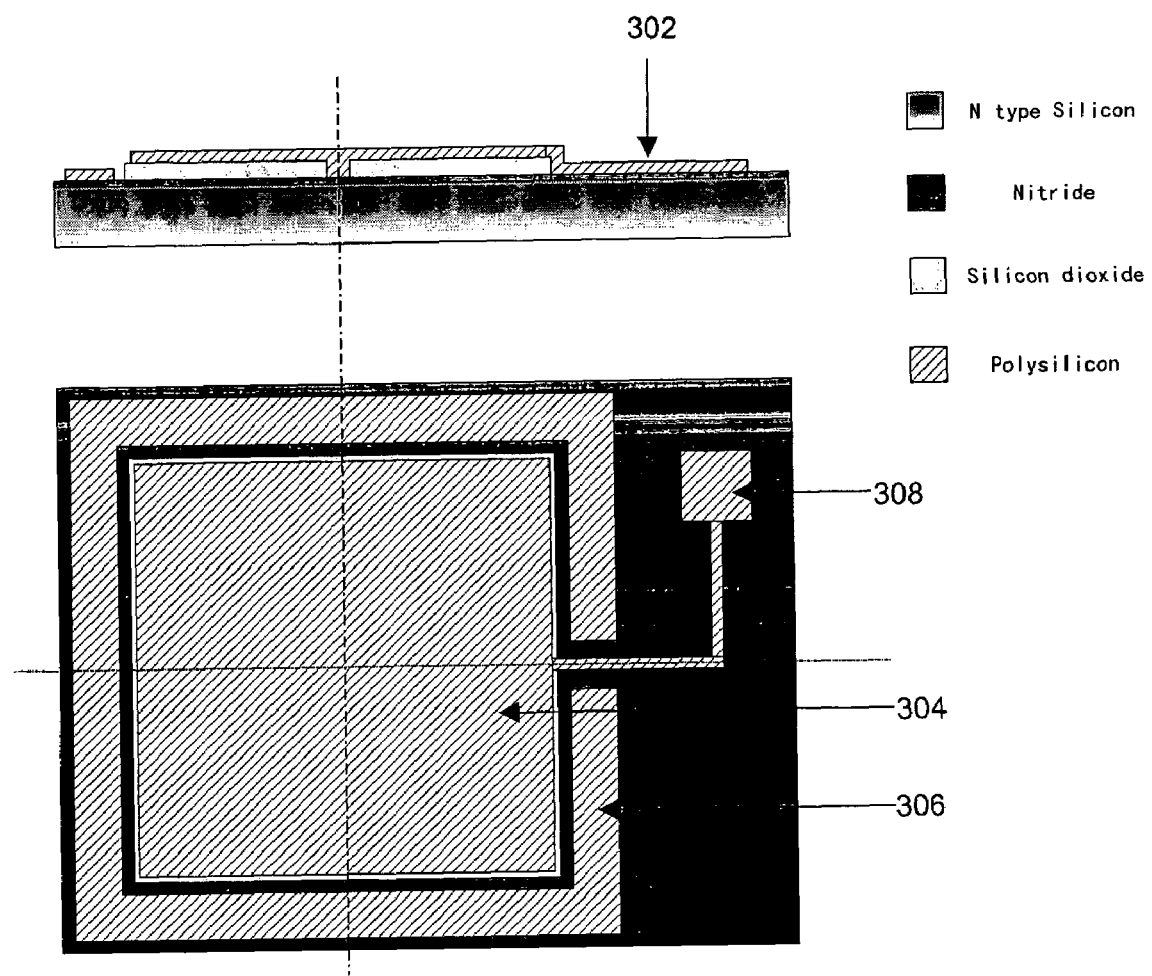
FIG. 3 is an illustration of a middle plate formation process in an example embodiment.

In Step 2, as illustrated in FIG. 3, a low tensile stress polysilicon layer 302 of about 2.0 µm thick is deposited to form the first structural layer of the proposed 3-plate micro capacitive pressure sensor in this example embodiment. The center square 304 is the proposed middle plate 106 as shown in FIG. 1, while the lateral polysilicon 306 encircling the center square will form the stationary edges. Since the middle plate 106 serves as an electrode of a parallel plate capacitor, electrical connection is provided in the form of a probe pad 308.

Figure 4:
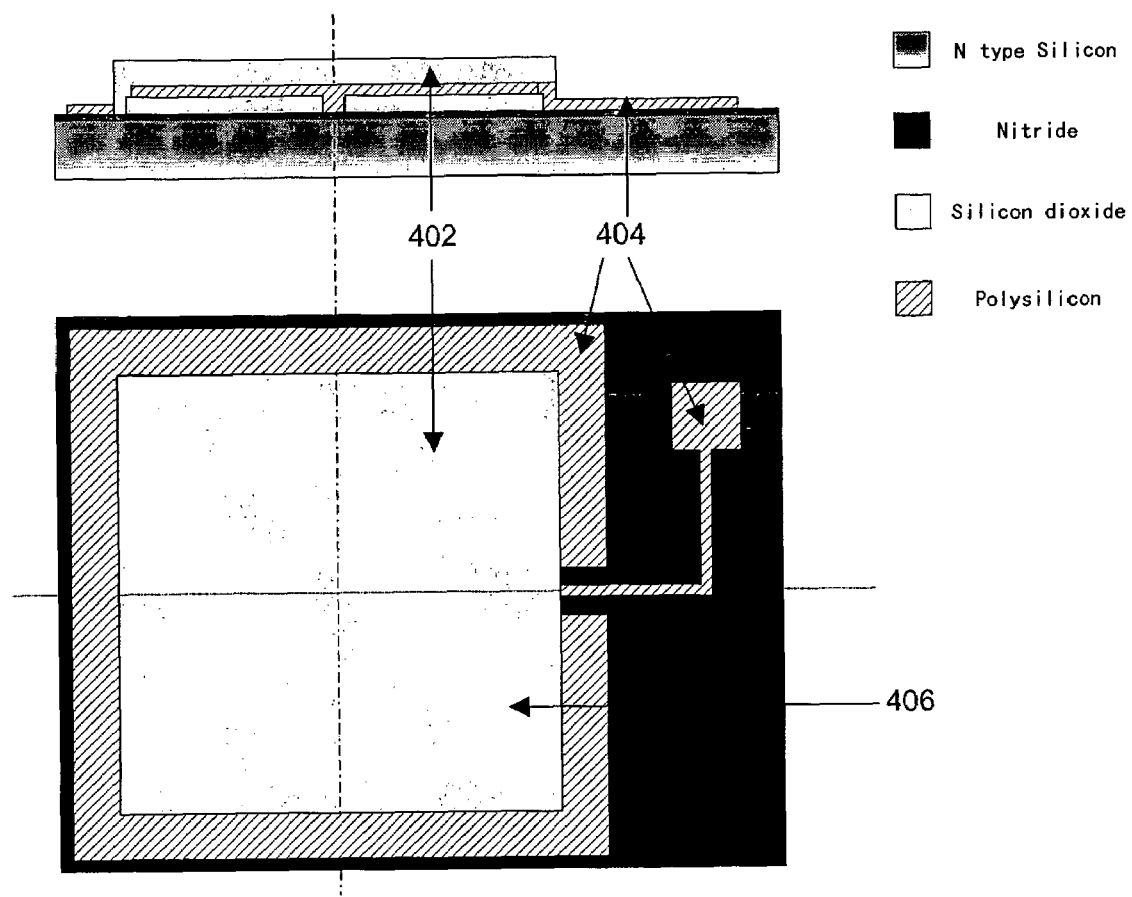
FIG. 4 is an illustration of a formation process of a gap between top and middle plates in an example embodiment.

In Step 3, as illustrated in FIG. 4, a silicon oxide layer 402 of about 6 µm is then deposited on the low tensile stress polysilicon structural layer 404 formed in Step 2. This silicon oxide layer 402 defines the gap between the proposed top plate 102 and middle plate 106 as illustrated in FIG. 1. Using a mask to pattern and etch the second silicon oxide layer 402, a square oxide layer 406 of about 1100 µm×1100 µm, that defines the size of the sealed chamber, is constructed in this example embodiment.

Figure 5:
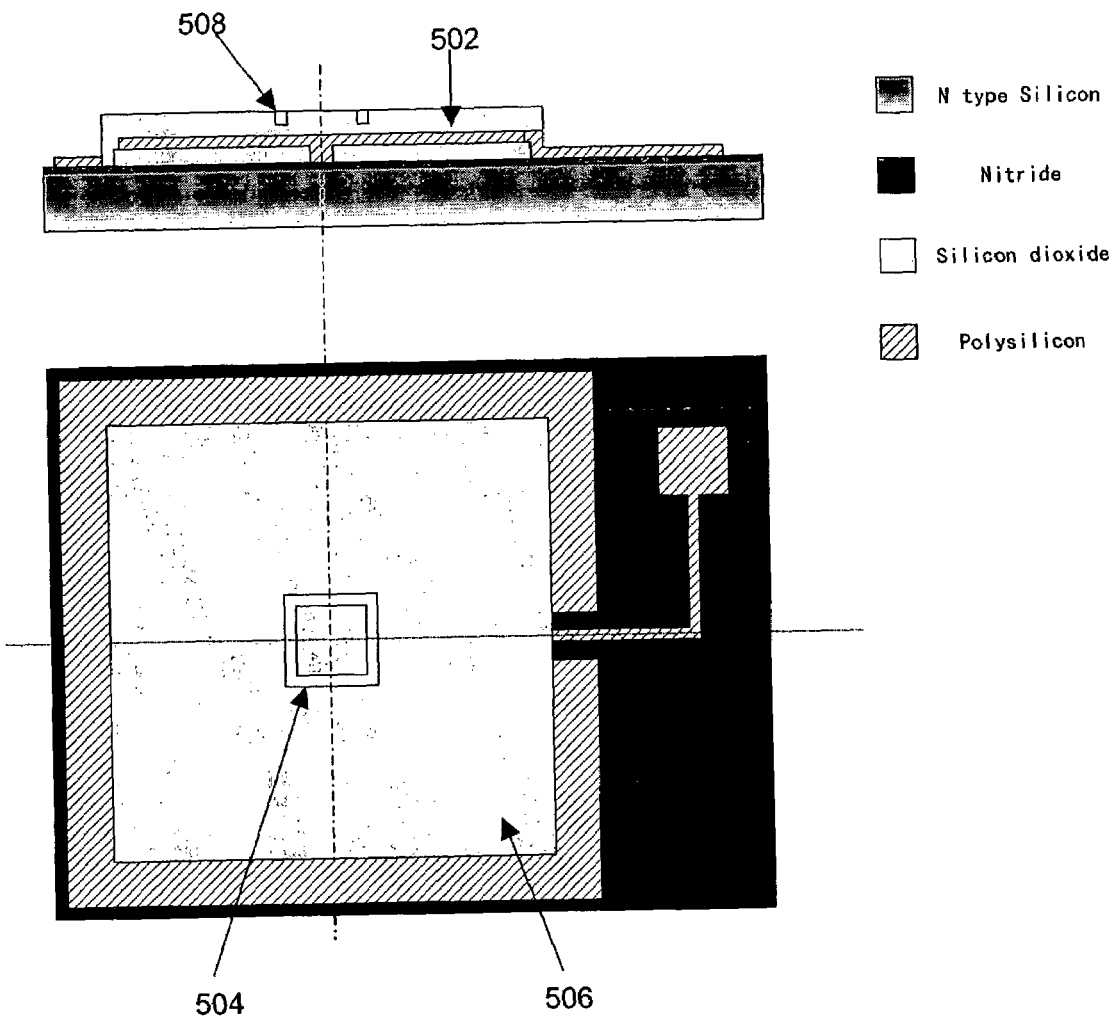
FIG. 5 is an illustration of a formation process of a square ring at the center of a second oxide layer in an example embodiment.

In Step 4, as illustrated in FIG. 5, the second silicon oxide layer 502 is patterned to construct a boss ring structure 504. A square ring structure 504 at the center of the oxide layer center 506 is removed to leave behind a small indentation 508. The indentation 508 is used to form the proposed boss ring structure 112 under the top plate 102 as illustrated in FIG. 1. Touch point pressure required by different applications is a function of the distance between the top plate 102 and middle plate 106 as well as the depth of the indentation 508.

Figure 6:
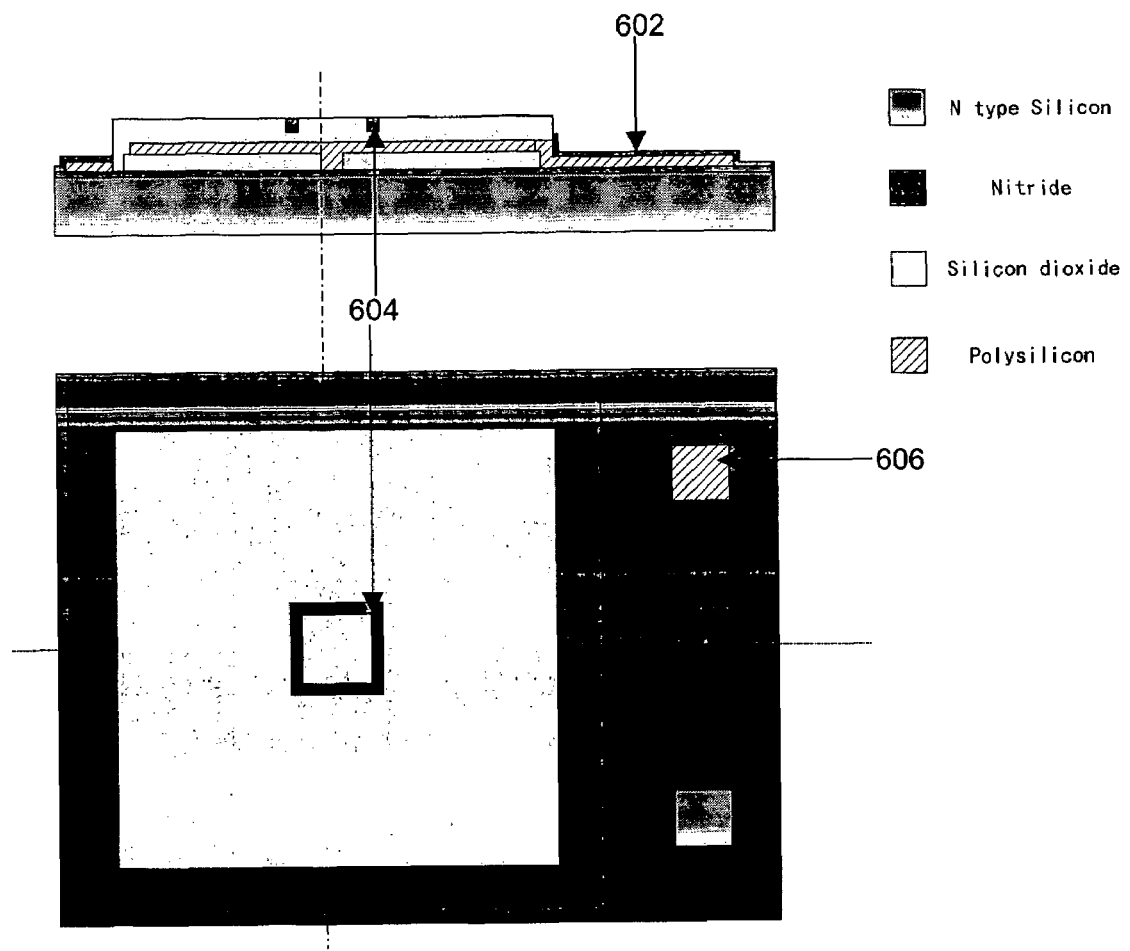
FIG. 6 is an illustration of a nitride layer deposition and patterning in an example embodiment.

In Step 5, as illustrated in FIG. 6, a layer of low stress nitride 602 of about 0.3 µm is deposited to provide an isolation layer in this example embodiment. This layer is between the proposed top 102 and middle plates 106 as illustrated in FIG. 1. Since the nitride fills the indentation 604 fabricated in Step 4, an electrical isolation will exist when the top plate 102 comes into contact with the middle plate 106. The nitride layer at the probe pads 606 are then etched away to produce the structure as illustrated in FIG. 6.

Figure 7:
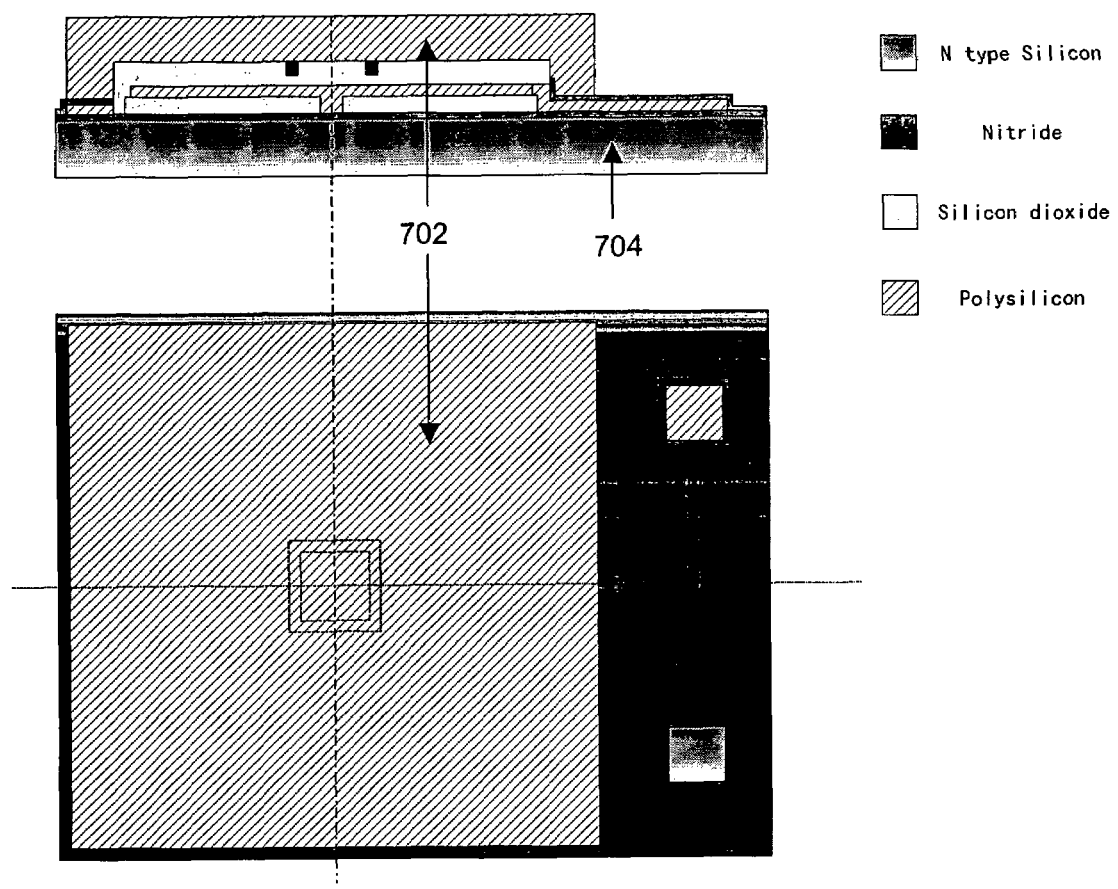
FIG. 7 is an illustration of a formation process of a top plate and fixed edges in an example embodiment.

In Step 6, as illustrated in FIG. 7, a polysilicon layer 702 of about 20 µm thick is deposited and patterned in this example embodiment. This patterned layer will form the proposed top plate 102 of the device 100 which serves as the pressure sensing diaphragm 102 as illustrated in FIG. 1. It also forms a sealed chamber between top plate 102 and substrate 704.

Figure 8:
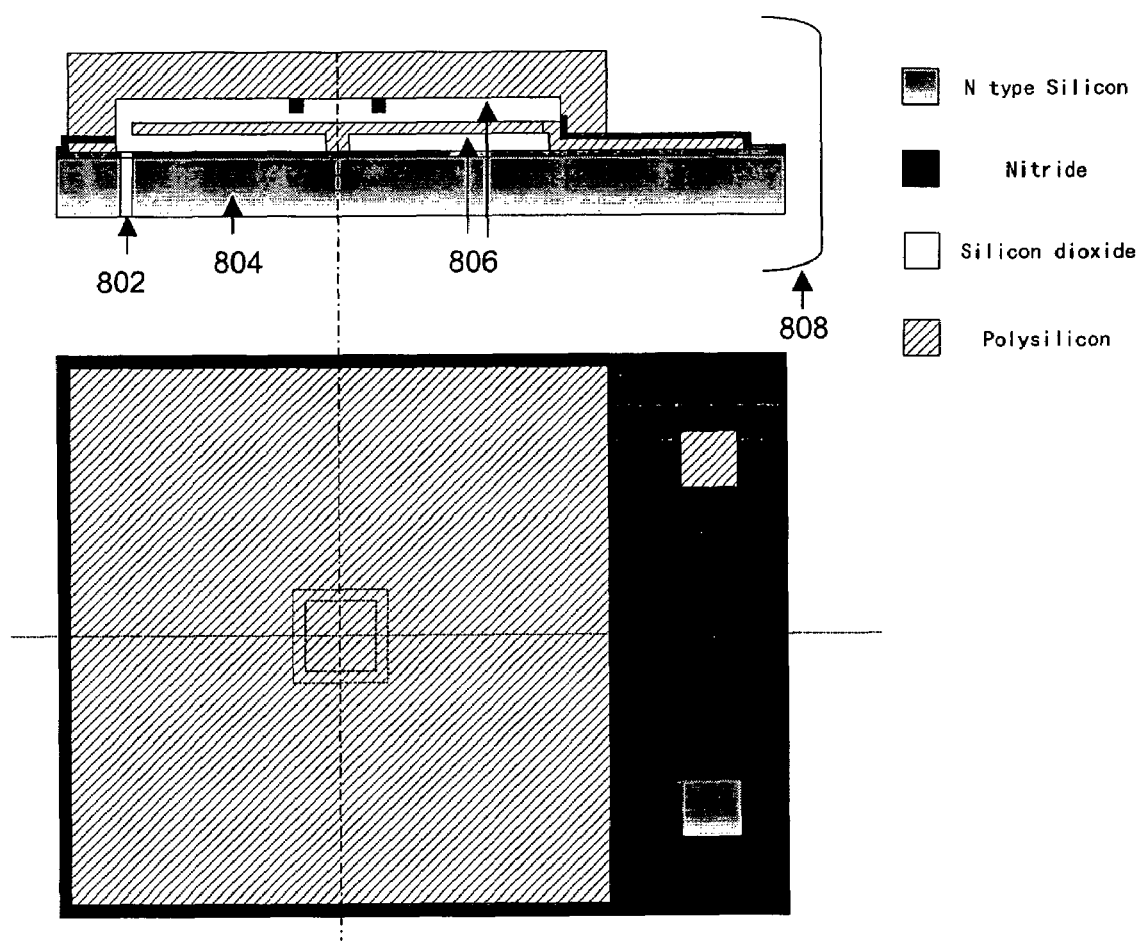
FIG. 8 is an illustration of a formation process of a small etch-hole at the backside of a wafer in an example embodiment.

In Step 7, as illustrated in FIG. 8, small through holes 802 are etched at the backside of the silicon wafer 804. Then, the structures 806 are released by immersing the device 808 in a hydrofluoric (HF) solution of about 49% concentration. The small holes 802 may be used to provide a means for controlling the reference pressure in the chamber.

Figure 9:
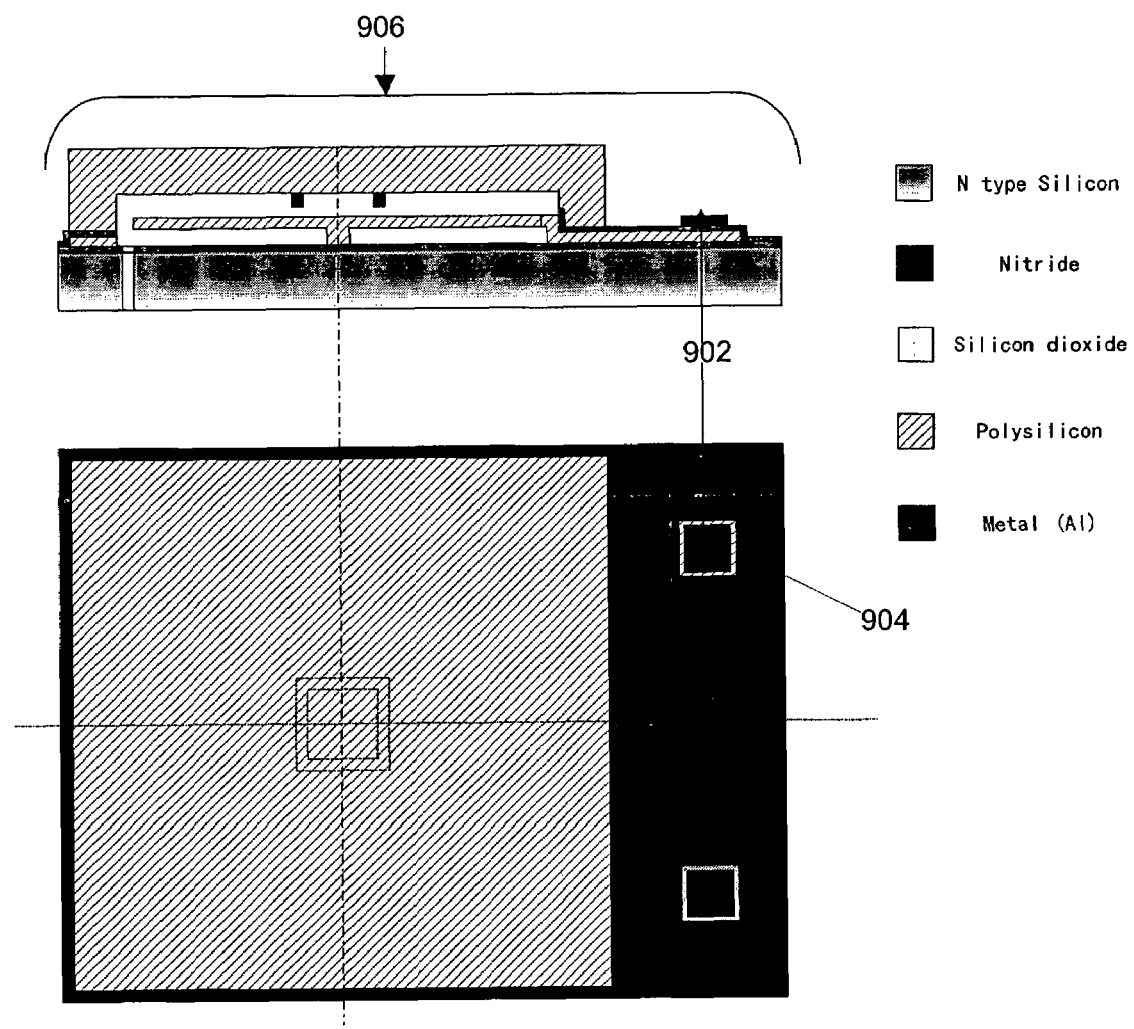
FIG. 9 is an illustration of a metalization process in an example embodiment.

In Step 8, as illustrated in FIG. 9, metal (Aluminum, Al or gold, Au) with a thin adhesion layer 902 is deposited by lift-off patterning. The side wall of the photoresist applied is sloped at a re-entrant angle, which provides breaks 904 between the metal 902 deposited on the surfaces of probe pads and that on the photoresist. The photoresist and unwanted metal (atop the photoresist) are then removed in a solvent bath. The final structure 906 is illustrated in FIG. 9.

In a second example embodiment, a fabrication approach using wafer bonding technology may be used to produce a three-plate structure for a pressure sensing device. It separates the process flow into two main steps:
1. Sacrificial etching for the cantilever middle plate;
2. Wafer-to-wafer bonding to add another plate.

Figure 10:
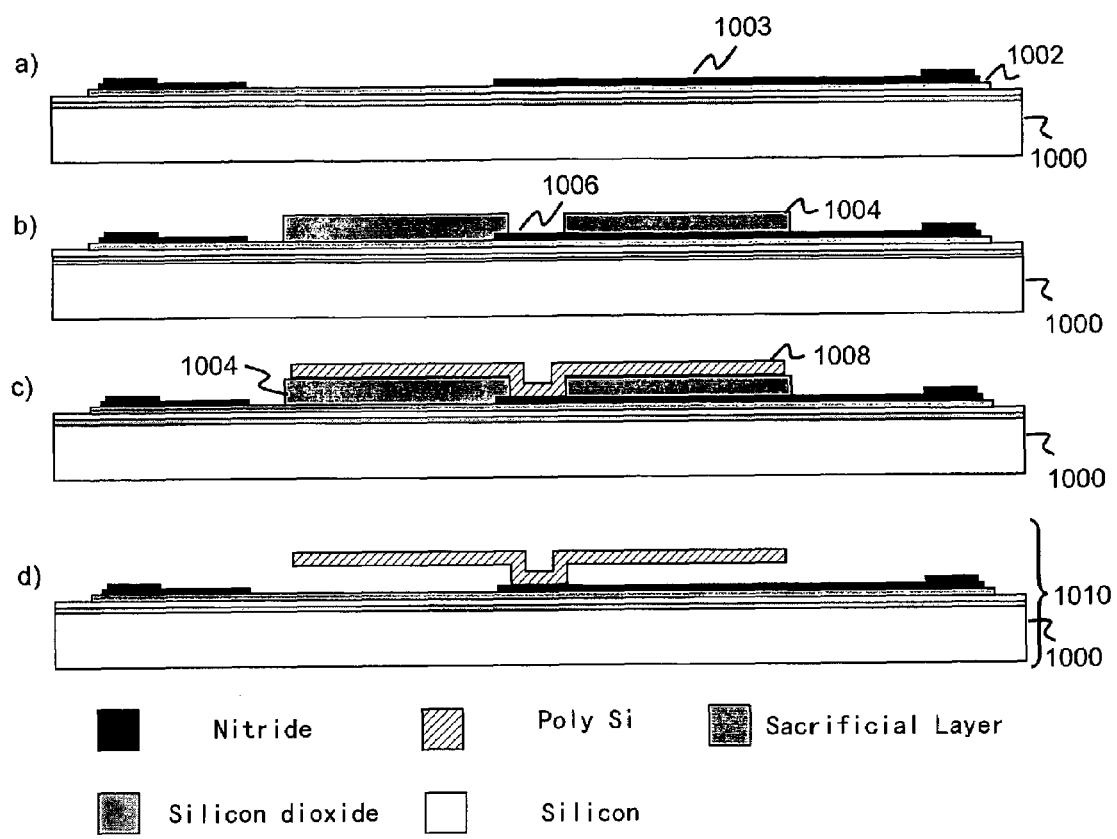
FIG. 10 is an illustration of a formation process of a cantilever in an example embodiment.

To micromachine a cantilever, the following steps are carried out and are as illustrated in FIG. 10. In this example embodiment, a silicon-on-insulator (SOI) wafer 1000 is utilised. Oil strains from the wafer 1000 are first removed by wet (or RCA) cleaning. On the device side of the SOI wafer 1000, photoresist (not shown) is deposited and patterned so that different die areas can be marked out on the wafer. Chemical Vapour Deposition (CVD) is then used to deposit a nitride layer 1002 for electrical insulation as illustrated in FIG. 10a, to a thickness of about 1 micron, in this example embodiment. The remaining photoresist is then removed. Photoresist (not shown) is again deposited and patterned using a second appropriate mask. A metalisation layer 1003 including bond pads are formed in this example embodiment by depositing about 20 nm of Chromium and about 200 nm of gold either by sputtering or e-beam evaporation. The remaining photoresist is then removed. A sacrificial layer 1004 such as silicon dioxide or phosphosilicate glass of about 2.5 µm thickness is then deposited in this example embodiment, as illustrated in FIG. 10b. Photoresist is deposited and patterned using a third appropriate mask. Etching of silicon dioxide 1004 is carried out using buffered hydrofluoric acid (BHF) in the example embodiments so that a post of a cantilever can be constructed in a feature 1006. Photoresist (not shown) is deposited and patterned using a fourth appropriate mask as illustrated in FIG. 10b. Polysilicon 1008 of about 2 µm thickness is then deposited in this example embodiment, as illustrated in FIG. 10c. The remaining photoresist is then removed, and the structure immersed into an HF solution in the example embodiment, and the silicon dioxide 1004 is etched away. The resulting cantilever structure 1010 is as illustrated in FIG. 10d.

Figure 11:
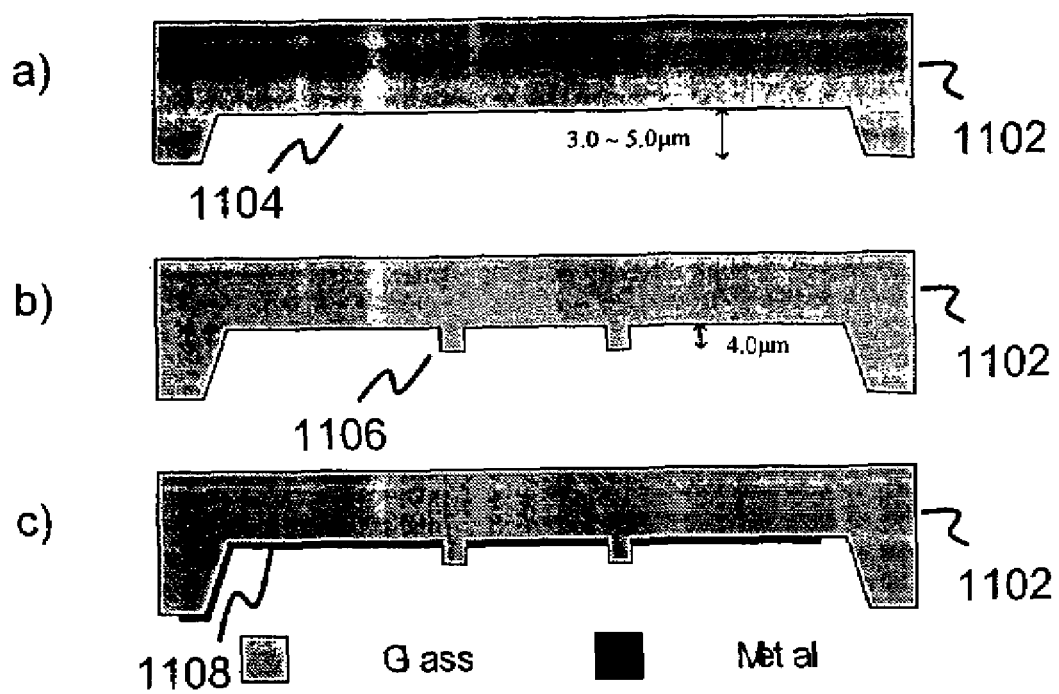
FIG. 11 is an illustration of a formation process of a boss ring structure and bond pads in an example embodiment.

To construct a glass base, the following steps are carried out and are as illustrated in FIG. 11. On a glass substrate 1102, photoresist (not shown) is deposited and patterned using a fifth appropriate mask. Wet etching is then carried out using BHF to form a cavity 1104 as illustrated in FIG. 11a. The remaining photoresist is then removed. Photoresist is deposited and patterned using a sixth appropriate mask. Wet etching is then carried out using BHF to form a boss ring structure 1106 as illustrated in FIG. 11b. The remaining photoresist is removed. Photoresist (not shown) is deposited and patterned using a seventh appropriate mask. Depositing about 20 nm of Chromium and about 200 nm of gold either by sputtering or e-beam evaporation in this example embodiment then forms a metalization layer 1108, including bond pads. The remaining photoresist is then removed.

Figure 12:
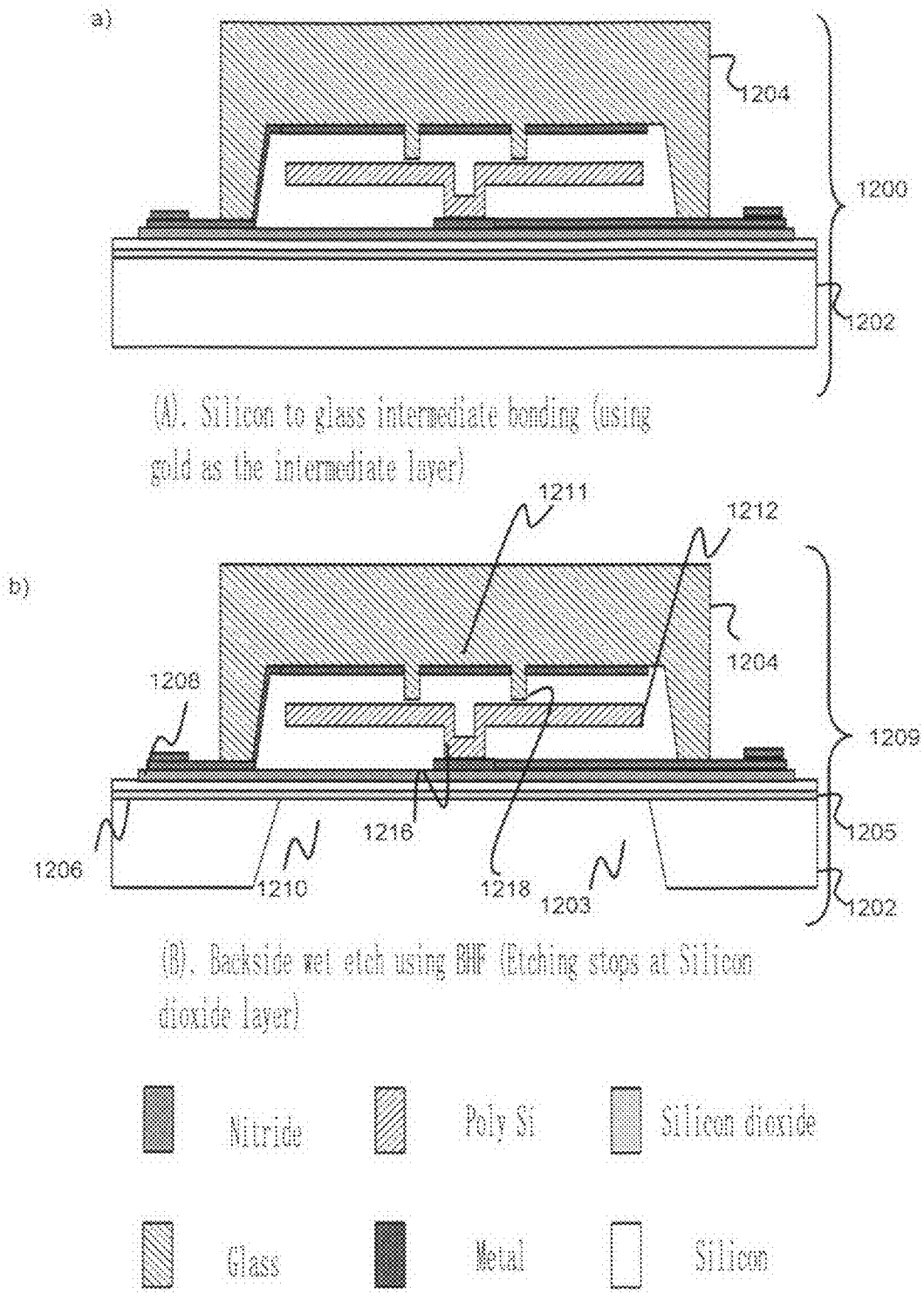
FIG. 12a is an illustration of a bonding process between a cantilever structure and a glass base in an example embodiment.
FIG. 12b is an illustration of etching of a substrate in an example embodiment. It also illustrates a schematic diagram of another MEMS pressure sensor in an example embodiment.

To combine the two parts together, the following steps are carried out and are as illustrated in FIG. 12. The SOI wafer and the glass substrate are cut up. In this example embodiment, each SOI wafer die 1202 is about 1 cm by 1 cm and each glass die 1204 is about 0.7 cm by 0.7 cm. The SOI wafer die 1202 and the glass base 1204 are then bonded together either using anodic bonding or frit glass bonding in this example embodiment. The structure 1200 is then formed as illustrated in FIG. 12a. The following steps are accomplished to form a cavity 1203 on the backside of SOI wafer die 1202. On the handle side of the SOI wafer die 1202, photoresist (not shown) is deposited and patterned using an appropriate mask. Wet etching is then carried out using potassium hydroxide (KOH) to remove approximately 100 µm of silicon (KOH etches silicon along the 111 plane at about 53° angle). An etch stop is provided by the native oxide layer 1205 of the SOI wafer die 1202, in the example embodiment of a thickness of typically about 1 micron.

The final structure 1209 in this example embodiment is illustrated in FIG. 12b. In order to withstand the high pressure, the diaphragm 1210 is designed in a manner to avoid rupture during exposure to a particular pressure regime. In the example embodiment, the thickness of the diaphragm 1210 is made up from the thickness of the oxide layer 1205 of about 1 micron, the thickness of the silicon layer 1206 of about 20 to 25 micron, and the thickness of the nitride layer 1208 of about 1 micron. Here, the thickness of the metalization layer on the nitride layer 1208, of about 220 nm, is negligible. The middle plate or cantilever 1212, is located between the diaphragm 1210 and the metalization layer 1211 on the glass die or device base 1204. The middle plate or cantilever 1212 is a free-standing structure supported only at the centre by a post 1216. When pressure is applied, the diaphragm 1210 will deflect. Beyond a pre-determined threshold pressure, the boss ring structure 1218 on the glass die or device base 1204 will come into contact with the middle plate or cantilever 1212 and cause it to deflect. Pressure is measured by monitoring the change in capacitance between the cantilever 1212 and the metalization layer 1211 on the substrate or base 1214. Since the middle plate 1212 is arranged as a cantilever, it magnifies the small deflections in the diaphragm 1210 and thus enables small changes in pressure on the diaphragm 1210 to be detected.

Figure 13:
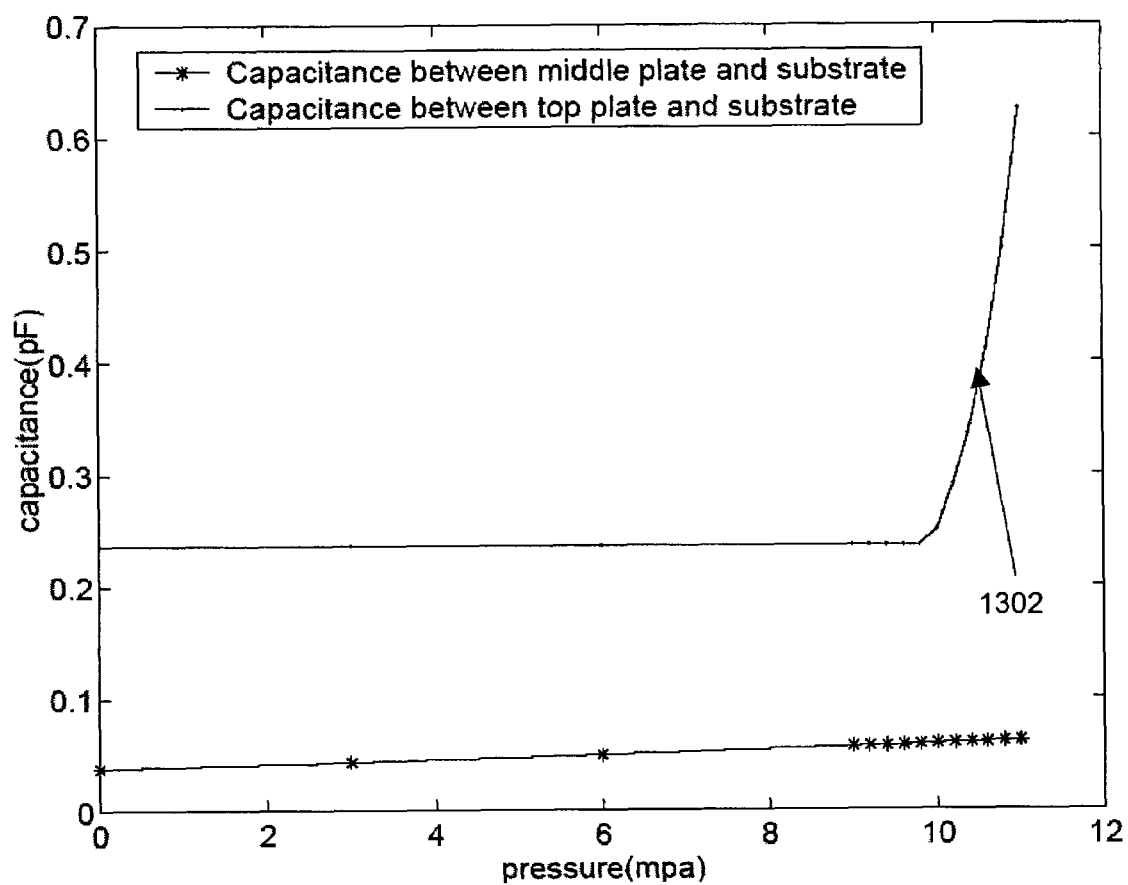
FIG. 13 is a data plot of a capacitance-pressure relationship of a MEMS pressure sensor in an example embodiment.

In FIG. 13, a set of simulation results for a capacitance-pressure relationship for the described device 100 in the first example embodiment is illustrated in a data plot. Similarly, in FIG. 14, a set of simulation results obtained for a capacitance-pressure relationship for the described device 1209 (see FIG. 12) in the second example embodiment is illustrated in a data plot. It is noted that the plotted curve "changes direction" 1400 and has a steeper gradient 1402 once the flexible cantilever 1212 (see FIG. 12) begins to bend.

Figure 14:
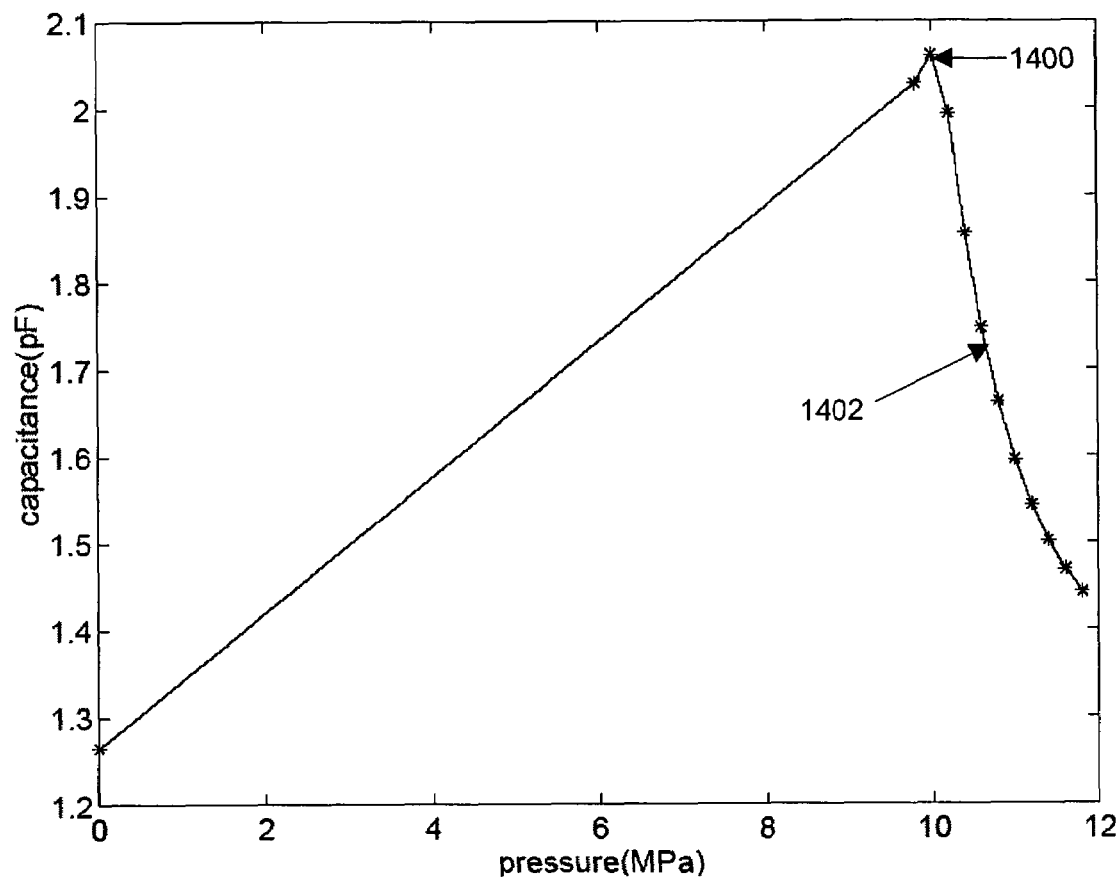
FIG. 14 is a data plot of a capacitance-pressure relationship of another MEMS pressure sensor in an example embodiment.

In FIGS. 13 and 14, it is illustrated that the changes in gradient of the data plots such as 1302 and 1402 enable the detection of changes in the pressure through the changes in capacitance measurements of the pressure sensing devices in the example embodiments.

The example embodiments may provide devices suitable for many applications such as tactile sensing. Tactile sensing is essential for human beings and very useful for robot motion control. The tactile organs in humans have high precision and high resolution, and contribute to dexterous motion of the human hand. The criteria for these tactile sensors are precision, high resolution and the ability to cover narrow surfaces. Binary switch-type tactile sensors are generally used in robotic applications because of their simplicity and robustness. However, it is impossible for such types of sensors to sense the magnitude of the contact force, since a binary switch sensor has only one pressure threshold. The devices provided by the example embodiments described above may be used for tactile sensor in humanoid robots or artificial limbs because it can provide high sensitivity around a predetermined threshold value.

Embodiments of the present invention do have a number of applications, including in monitoring tyre pressure. Monitoring tyre pressure is one of the most important new developments in car safety, and the application offers probably the highest growth potential for sensors in the automotive industry. There are a number of cost- and safety related reasons for using tyre pressure monitoring. Over- and under-inflation can significantly decrease tyre life; while under-inflation increases fuel consumption by some 4% per 0.6 bar of pressure.

Tyres that are 50% under-inflated increase a vehicle's braking distance by up to 10 meters in wet conditions when travelling at 100 km/h and using ABS. Under-inflated tyres also involve a serious risk of hydroplaning; low front tyre pressure results in understeer, and low rear tyre pressure in oversteer. A capacitive pressure sensor may be useful for monitoring tyre pressure because any change in pressure is simply detected by variations in the distance between the electrodes in the sensor.

As no additional material or components are required for detecting pressure, example embodiments of the present invention can provide a robust unit that may be well suited for withstanding the harsh environment inside a tyre. Embodiments of the invention may have the added advantage of lower power consumption. There is typically a need to trigger the tyre monitoring system only when the pressure is within a certain range. The pressure range depends on the tyre size is typically about 30-40 psi. By selecting the separation between the components in example embodiments, for example the separation between top plate 102, middle plate 106, and substrate 104 in the example embodiment described with reference to FIG. 1, or diaphragm 1210, middle plate 1212 and the metalisation layer 1211 on the substrate or base 1214 in the example embodiment described with reference to FIG. 12, the movable plates can be designed to come into contact only when pressure is greater than e.g. 30 psi. By activating the signal conditioning circuit only when the two movable plates are in contact, power consumption can be reduced.

Figure 15:
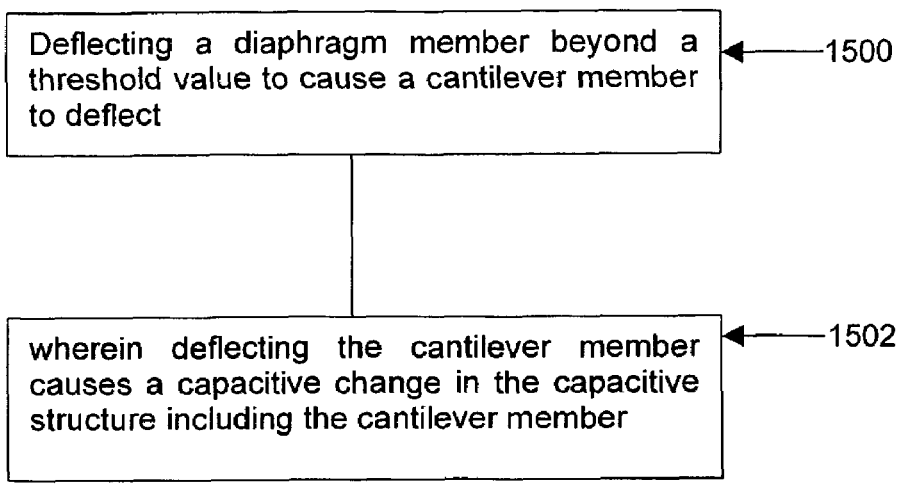
FIG. 15 is a flow diagram illustrating a method of pressure sensing in an example embodiment.

FIG. 15 shows a flowchart illustrating a method for pressure sensing in an example embodiment. At step 1500, a diaphragm member is deflected beyond a threshold value to cause a cantilever member to deflect, and, at step 1502, deflection of the cantilever member causes a capacitive change in the capacitive structure including the cantilever member.

Figure 16:
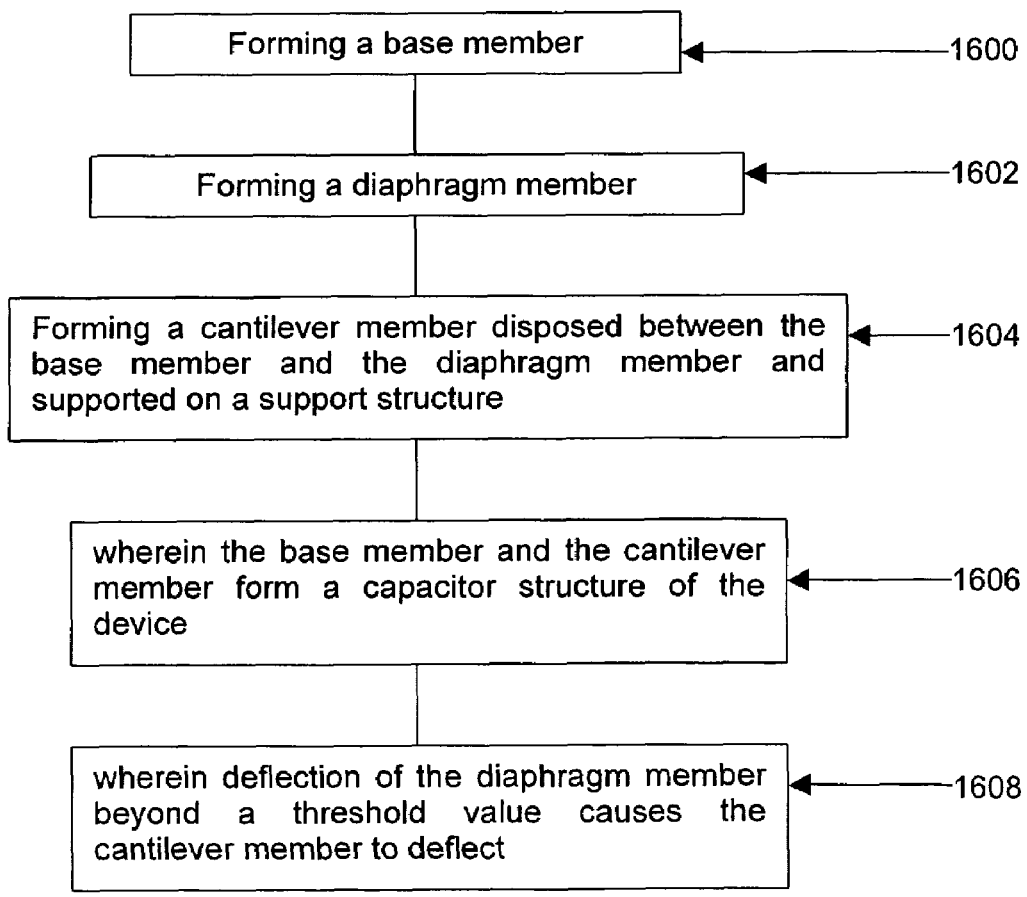
FIG. 16 is a flow diagram illustrating a method of fabricating a pressure sensing device in an example embodiment.

FIG. 16 shows a flowchart illustrating a method of fabricating a pressure sensing device in an example embodiment. At step 1600, a base member is formed, and, at step 1602, a diaphragm member is formed. At step 1604, a cantilever member disposed between the base member and the diaphragm member and supported on a support structure is formed, at step 1606, the base member and the cantilever member form a capacitor structure of the device, and at step 1608, the deflection of the diaphragm member beyond a threshold value causes the cantilever member to deflect to cause a capacitive change in the capacitor structure.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A capacitive pressure sensing device comprising:
a base member;
a diaphragm member deflectable under an external pressure;
a cantilever member disposed between the base member and the diaphragm member and supported on a support structure; and
a contact member moveable relative to the cantilever member under deflection of the diaphragm member and separated by a gap from the cantilever member in a state when no pressure is applied to the diaphragm member,
wherein the base member and the cantilever member form acapacitor structure of the device, and
wherein deflection of the diaphragm member beyond a threshold value causes the contact member to contact the cantilever member causing the cantilever member to deflect to cause a capacitive change in the capacitor structure.

2. The device as claimed in claim 1, wherein the contact member is disposed on the base member.

3. The device as claimed in any one of claim 2, wherein the support structure supporting the cantilever member is disposed on the diaphragm member.

4. The device as claimed in claim 1, wherein the contact member is disposed on the diaphragm member.

5. The device as claimed in claim 4, wherein the support structure supporting the cantilever member is disposed on the base member.

6. The device as claimed in any one of claim 1, wherein the contact member comprises a contact area disposed symmetrically around said support structure supporting the cantilever member.

7. The device as claimed in any one of claim 1, wherein the support structure supporting the cantilever member centrally supports the cantilever member.

8. The device as claimed in any one of claim 1, wherein the cantilever member comprises polysilicon.

9. The device as claimed in any one of claim 1, wherein the diaphragm member comprises polysilicon.

10. The device as claimed in any one of claim 1, wherein the base member comprises a silicon wafer.

11. The device as claimed in any one of claim 1, wherein the base member comprises a glass substrate.

12. The device as claimed in any one of claim 1, wherein the contact member comprises a nitride material.

13. A method of pressure sensing comprising:
providing a contact member moveable relative to the cantilever member under deflection of a diaphragm member and separated by a gap from the cantilever member in a state when no pressure is applied to a diaphragm member; and deflecting the diaphragm member under an external pressure beyond a threshold value to cause the contact member to contact the cantilever member causing the cantilever member to deflect under the influence of the diaphragm member, wherein deflection of the cantilever member causes a capacitive change in a capacitive structure including the cantilever member.

14. A method of fabricating a pressure sensing device comprising:

forming a base member;

forming a diaphragm member deflectable under an external pressure;

forming a cantilever member disposed between the base member and the diaphragm member and supported on a support structure;

forming a contact member moveable relative to the cantilever member under deflection of the diaphragm member and separated by a gap from a cantilever member in a state when no pressure is applied to the diaphragm member;

wherein the base member and the cantilever member form a capacitor structure of the device; and wherein deflection of the diaphragm member beyond a threshold value causes the contact member to contact the cantilever member causing the cantilever member to deflect to cause a capacitive change in the capacitor structure.

15. The method as claimed in claim 14, wherein forming the cantilever member comprises utilising thin film deposition techniques and sacrificial etching techniques.

16. The method as claimed in claims 14, wherein forming the diaphragm member comprises utilising thin film deposition techniques and etching techniques.

17. The method as claimed in any one of claims 14, wherein forming the base member comprises providing a substrate.

18. The method as claimed in claim 17, wherein forming the base member comprises etching the substrate.

* * * * *

UNITED STATES PATENT AND TRADEMARK OFFICE
CERTIFICATE OF CORRECTION

PATENT NO. : 7,478,559 B2  Page 1 of 1
APPLICATION NO. : 10/581782
DATED : January 20, 2009
INVENTOR(S) : Woei Wan Tan It is certified that error appears in the above-identified patent and that said Letters Patent is hereby corrected as shown below:

Column 8, line 32, Claim 1  Delete "acapacitor",
Insert --a capacitor--

Column 10, line 14, Claim 16  Delete "claims",
Insert --claim--

Column 10, line 17, Claim 17  Delete "claims",
Insert --claim--

Signed and Sealed this

Sixth Day of October, 2009

David J. Kappos
*Director of the United States Patent and Trademark Office*